United States Patent
Jung et al.

(10) Patent No.: US 8,929,832 B2
(45) Date of Patent: Jan. 6, 2015

(54) APPARATUS AND METHOD OF REPORTING LOGGED MEASUREMENT IN WIRELESS COMMUNICATION SYSTEM

(75) Inventors: Sung Hoon Jung, Anyang-si (KR); Sung Duck Chun, Anyang-si (KR); Seung June Yi, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 702 days.

(21) Appl. No.: 13/207,963

(22) Filed: Aug. 11, 2011

(65) Prior Publication Data

US 2012/0040621 A1 Feb. 16, 2012

Related U.S. Application Data

(60) Provisional application No. 61/373,256, filed on Aug. 12, 2010, provisional application No. 61/389,264, filed on Oct. 3, 2010, provisional application No. 61/410,851, filed on Nov. 5, 2010.

(51) Int. Cl.
*H04B 17/00* (2006.01)
*H04W 24/10* (2009.01)

(52) U.S. Cl.
CPC .................................... *H04W 24/10* (2013.01)
USPC ........ 455/67.11; 455/423; 455/424; 455/425; 370/252

(58) Field of Classification Search
CPC ... H04W 24/10; H04W 76/046; H04W 24/00; H04W 24/08; H04W 16/18; H04W 24/02; H04W 24/04; H04W 28/06; H04W 4/00; H04W 64/00
USPC ................ 455/67.11, 423, 424, 425; 370/252
See application file for complete search history.

(56) References Cited

U.S. PATENT DOCUMENTS

| | | | |
|---|---|---|---|
| 2011/0199923 A1* | 8/2011 | Persson et al. ................ | 370/252 |
| 2011/0306345 A1* | 12/2011 | Wu .............................. | 455/436 |
| 2014/0016566 A1 | 1/2014 | Wu | |

FOREIGN PATENT DOCUMENTS

| | | |
|---|---|---|
| EP | 2 398 270 A2 | 12/2011 |
| JP | 2012-5123 A | 1/2012 |

(Continued)

OTHER PUBLICATIONS

ETSI, "Reconfigurable Radio Systems (RRS); Functional Archtecture (FA) for the Management and Control of Reconfigurable Radio Systems," ETSI TR 102 682 v.1.1.1, Jul. 2009, pp. 1-42.

(Continued)

*Primary Examiner* — Shaima Q Aminzay
(74) *Attorney, Agent, or Firm* — Birch, Stewart, Kolasch & Birch, LLP

(57) ABSTRACT

A method and apparatus of reporting a logged measurement in a wireless communication system are provided. A user equipment receives a Minimization of Drive Tests (MDT) configuration and logs measurements based on the MDT configuration to collect a logged measurement. The user equipment receives an information request from a base station, to request the logged measurement, and transmits an information response to the base station that includes a part of the logged measurement and an availability indicator indicating that all entries in the logged measurement are not included in the information response. The availability indicator indicates a total size of the logged measurement to be received by the base station or an expected number of segments of the logged measurement to be received by the base station. The availability indicator further indicates a last segment of the logged measurement to be received by the base station.

15 Claims, 13 Drawing Sheets

(56) References Cited

FOREIGN PATENT DOCUMENTS

| JP | 2013-515654 A | 5/2013 |
|---|---|---|
| WO | WO 2011/080514 A2 | 7/2011 |
| WO | WO 2011/160274 A1 | 12/2011 |

OTHER PUBLICATIONS

Narayanan et al., "Using History to Improve Mobile Application Adaptation," Proceedings of the 3rd IEEE Workshop on Mobile Computing Systems and Applications, Monterey, CA, Dec. 2000, pp. 31-40.
Nokia Corporation, Nokia Siemens Networks, "MDT Mobility Optimization," 3GPP TSG-RAN WG2 Meeting #67bis, R2-095637, Agenda Item 4.2.2.1, Miyazaki, Japan, Oct. 12-16, 2009, 7 pages.
Zhang et al., "Intrusion Detection in Wireless Ad-Hoc Networks," MOBICOM, Boston, MA, 2000, pp. 275-283.
3GPP, "Technical Specification Group TSG RAN Universal Terrestrial Radio Access (UTRA) and Evolved Universal Terrestrial Radio Access (E-UTRA; Radio measurement collection for Minimization of Drive Tests (MDT); Overall description . . . ", 3GPP TS 37.320 V1.0.0, R2-105238, Aug. 2010, pp. 1-15.
Ericsson et al., "Introduction of bands XX (900 MHz) and XXII (3500 MHz)", 3GPP TSG-RAN WG2 Meeting #68bis, R2-100245, Valencia, Spain, Jan. 18-22, 2010, 4 pages.
Ericsson et al., "MDT log size restriction issues", 3GPP TSG-RAN2 Meeting #71bis, R2-105817, Xi'an, China, Oct. 11-15, 2010, pp. 1-2.
LG Electronics Inc., "MDT log size issues", 3GPP TSG-RAN2 Meeting #71, R2-104842, Madrid, Spain, Aug. 23-27, 2010, pp. 1-2.
LG Electronics Inc., "MDT Log Transport", 3GPP TSG-RAN2 Meeting #71bis, R2-105465, Xian, China, Oct. 10-15, 2010, pp. 1-4.
Nokia Corporation et al., "Log reporting considerations", 3GPP TSG-RAN WG2 Meeting #70bis, R2-103511, Stockholm, Sweden, Jun. 28-Jul. 2, 2010, 3 pages.
Samsung, "Max MDT Log Size", 3GPP TSG RAN WG2 #71bis, R2-105799, Xi'an, China, Oct. 11-15, 2010, pp. 1-3.
Alcatel-Lucent, "Idle Mode Logged MDT reporting mechanism", 3GPP TSG-RAN WG2 Meeting #69bis, R2-102056, Apr. 12-16, 2010, 4 pages.
LG Electronics Inc., "Validity of MDT log after logging duration timer expiry", 3GPP TSG-RAN WG2 #70bis, R2-104003, Jun. 28-Jul. 2, 2010, 2 pages.
Ericsson, "Triggers for logged MDT measurement reporting," 3GPP TSG-RAN WG2 #69, Tdoc R2-101426, San Francisco USA, Feb. 22-26, 2010, pp. 1-3.
NTT DoCoMo, Inc., "Log availability indication condition and configuration state," 3GPP TSG-RAN2#70, R2-102905, Montreal, Canada, May 10-14, 2010, pp. 1-5.
Samsung, "Configuration handling for logged MDT," 3GPP TSG RAN WG2 #70, R2-102783, May 10-14, 2010, Montreal, Canada, pp. 1-3.

\* cited by examiner

APPARATUS AND METHOD OF REPORTING LOGGED MEASUREMENT IN WIRELESS COMMUNICATION SYSTEM

CROSS-REFERENCE TO RELATED APPLICATIONS

This application claims the benefit of priority of U.S. Provisional applications 61/373,256 filed on Aug. 12, 2010, 61/389,264 filed on Oct. 3, 2010, and 61/410,851 filed on Nov. 5, 2010, all of which are incorporated by reference in their entirety herein.

BACKGROUND OF THE INVENTION

1. Field of the invention

The present invention relates to wireless communications, and more particularly, to a method and apparatus for reporting a logged measurement in a wireless communication system.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink The 3GPP LTE employs multiple input multiple output (MIMO) having up to four antennas. In recent years, there is an ongoing discussion on 3GPP LTE-advanced (LTE-A) that is an evolution of the 3GPP LTE.

Minimization of driving tests (MDT) is a test performed by service providers for coverage optimization by using a user equipment (UE) instead of using an automobile. A coverage varies depending on a location of a base station (BS), deployment of buildings nearby, a user's usage environment, etc. Therefore, it is required for the service providers to periodically perform the driving test, and a lot of costs and resources are consumed. The MDT is used when the service provider measures the coverage by using the UE.

The MDT can be classified into a logged MDT and an immediate MDT. According to the logged MDT, after performing the MDT measurement, the UE delivers a logged measurement to a network available at a time of a reporting condition. According to the immediate MDT, after performing the MDT measurement, the UE delivers the measurement to the network at points in time when a configured reporting condition is satisfied. The logged MDT performs the MDT measurement in a radio resource control (RRC) idle mode, but the immediate MDT performs the MDT measurement in an RRC connected mode.

When the BS requests the UE to report a logged measurement, the UE transmits one report message in general. However, a maximum size of message that can be transmitted at once is fixed. For example, a maximum size of a packet data convergence protocol (PDCP) service data unit (SDU) is 8188 bytes.

A method for dealing with a case where a size of a logged measurement exceeds a size of one message has not been introduced yet.

SUMMARY OF THE INVENTION

The present invention provides a method and apparatus for reporting a logged measurement in a wireless communication system.

In an aspect, a method of reporting a logged measurement in a wireless communication system is provided. The method includes receiving, by a user equipment, a Minimization of Drive Tests (MDT) configuration, logging, by the user equipment, measurements based on the MDT configuration to collect a logged measurement, receiving, by the user equipment, an information request to request the logged measurement from a base station, and transmitting, by the user equipment, an information response to the base station, wherein the information response includes a part of the logged measurement and an availability indicator, the availability indicator indicating that all entries in the logged measurement are not included in the information response.

The logged measurement may include a plurality of logged entries, each logged entry including measurement results of at least one serving cell and time information.

The information response may include one or more logged entries from the logged measurement starting from entries logged first.

The method may further include transmitting, by the user equipment, a logging indicator to the base station, the logging indicator indicating an availability of the logged measurement.

In another aspect, an apparatus of reporting a logged measurement in a wireless communication system is provided. The apparatus includes a radio frequency unit for transmitting and receiving radio signals, and a processor operatively coupled with the radio frequency unit and configured for receiving a Minimization of Drive Tests (MDT) configuration, logging measurements based on the MDT configuration to collect a logged measurement, receiving an information request to request the logged measurement from a base station, and transmitting an information response to the base station, wherein the information response includes a part of the logged measurement and an availability indicator, the availability indicator indicating that all entries in the logged measurement are not included in the information response.

A user equipment can send all logged measurements to a base station even if a size of the logged measurement increases. Service providers can acquire information on a desired wireless environment by using the logged measurements.

DESCRIPTION OF EXEMPLARY EMBODIMENTS

Figure 1:
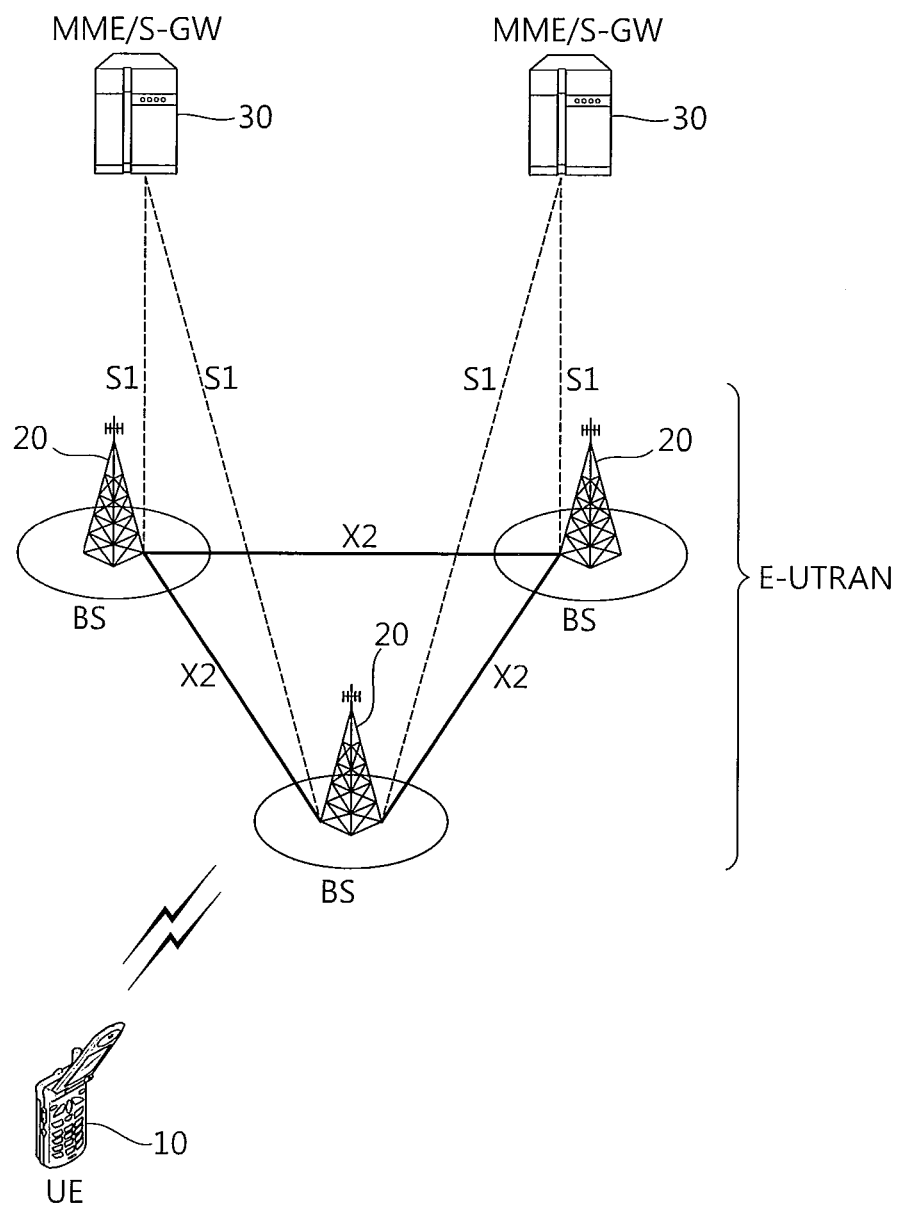
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MIME) through S1-MME and to a serving gateway (S-GW) through S1-U.

The EPC 30 includes an MME, an S-GW, and a packet data network-gateway (P-GW). The MME has access information of the LIE or capability information of the UE, and such information is generally used for mobility management of the UE. The S-GW is a gateway having an E-UTRAN as an end point. The P-GW is a gateway having a PDN as an end point.

Layers of a radio interface protocol between the LIE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
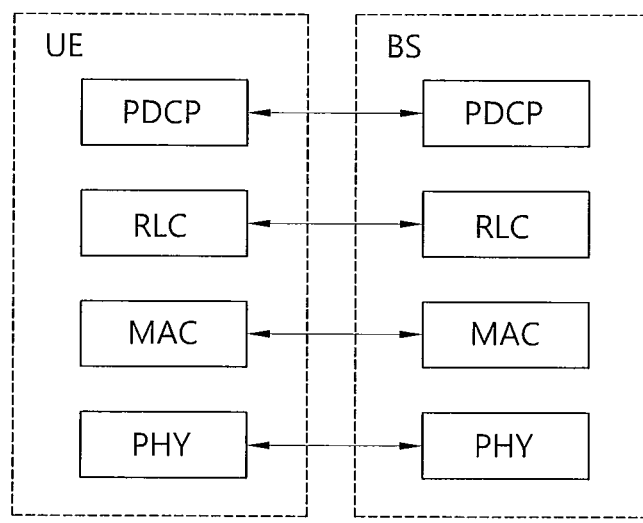
FIG. 2 is a diagram showing a radio protocol architecture for a user plane.
Figure 3:
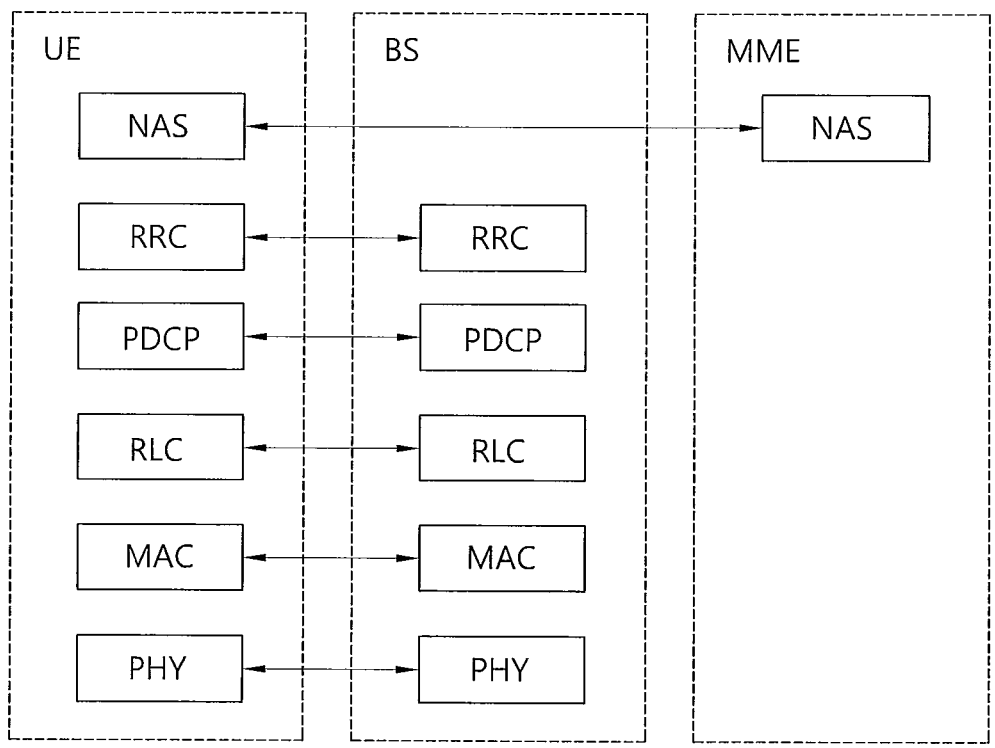
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred as an RRC connected mode), and otherwise the UE is in an RRC idle state (also may be referred as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be described.

The system information includes essential information that must be known to a UE to access a BS. Thus, the UE has to receive all of the system information before accessing the BS. Further, the UE must always have the latest system information. Since the system information is information that must be known to all UEs in one cell, the BS periodically transmits the system information.

According to the section 5.2.2 of 3GPP TS 36.331 V8.4.0 (2008-12) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a particular cell. The SB reports transmission information (e.g., a transmission period or the like) of SIBs. The SIB is a group of a plurality of pieces of system information related to each other. For example, an SIB includes only information of a neighbor cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

The service type provided by a cell can be classified as follows.

1) Acceptable cell: This cell serves a UE with a limited service. This cell is not barred from the perspective of the UE, and satisfies a cell selection criterion of the UE.

2) Suitable cell: This cell serves a UE with a regular service. This cell satisfies a condition of the acceptable cell, and also satisfies additional conditions. Regarding the additional conditions, this cell has to belong to a PLMN to which the UE can access, and a tracking area update procedure of the UE must not be barred in this cell. If the corresponding cell is a CSG cell, this cell must be accessible by the UE as a CSG member.

3) Barred cell: Information indicating that a cell is a barred cell is broadcast in this cell by using the system information.

4) Reserved cell: Information indicating that a cell is a reserved cell is broadcast in this cell by using the system information.

Next, procedures for measurements and measurement reports will be described in detail.

It is necessary for a wireless communication system to support mobility of a UE. Therefore, the UE persistently measures quality of a serving cell providing a current service and quality of a neighbor cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (e.g., a global cell identity) of the specific cell, location identification information indicating a location of the specific cell (e.g., a tracking area code), and/or other cell information (e.g., whether it is a member of a closed subscriber group (CSG) cell).

While moving, if the UE determines that quality of a specific region is significantly poor, the UE may report a measurement result and location information on the poor cell to the network. The network may attempt to optimize the network on the basis of the measurement result reported from UEs which assist the network operation.

In a wireless communication system having a frequency reuse factor of 1, mobility is generally supported between different cells existing in the same frequency band. Therefore, in order to properly guarantee the UE mobility, the UE has to properly measure cell information and quality of neighbor cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

Service providers may operate networks by using a plurality of frequency bands. If a service of a communication system is provided by using the plurality of frequency bands, optimal mobility can be guaranteed to the UE when the UE is able to properly measure cell information and quality of neighbor cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Hereinafter, by referring to the 3GPP TS 36.304 V8.8.0 (2009-12) "User Equipment (UE) procedures in idle mode (Release 8)", a method and procedure for selecting a cell by a UE will be described in detail.

After a UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called cell reselection. A basic object of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority in the first place than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The steps for cell reselection are as follows.

First, A UE receives from a BS parameters for cell reselection.

Second, the UE measures quality of a serving cell and a neighboring cell for cell reselection.

Third, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g., cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Now, the ranking used in a cell reselection evaluation process will be described.

A ranking criterion used to assign a priority to a cell is defined by Equation 1 as shown:

$$RS = Q_{meas,s} + Q_{hyst}, \quad Rn = Q_{means,n} - Q_{offset} \qquad \text{[Equation 1]}$$

where Rs denotes a ranking value of a serving cell, Rn denotes a ranking criterion of a neighboring cell, Qmeas,s denotes a quality value measured for the serving cell by the UE, Qmeas,n denotes a quality value measured for the neighboring cell by the UE, Qhyst denotes a hysteresis value for ranking, and Qoffset denotes an offset between two cells.

In the intra-frequency cell reselection, if the UE receives an offset Qoffsets,n between the serving cell and the neighboring cell, Qffoset=Qoffsets,n. Otherwise, Qffoset=0.

In the inter-frequency cell reselection, if the UE receives the offset Qoffsets,n, Qoffset=Qoffsets,n+Qfrequency. Otherwise, Qoffset=Qfrequency.

If the ranking criterion Rs of the serving cell and the ranging criterion Rn of the neighboring cell are not much different from each other and constantly vary, ranking orders of the serving cell and the neighboring cell may change frequently. Thus, the serving cell and the neighboring cell may be reselected alternately while changing their ranking orders too often. In order to prevent the UE from reselecting two cells alternately, the hysteresis value Qhyst is used to give a hysteresis in the cell reselection.

The UE measures the ranking criterion Rs of the serving cell and the ranking criterion Rn of the neighboring cell according to the above equation. A cell having the greatest ranking criterion value is reselected by considering this cell as a best-ranked cell.

In the above-mentioned cell reselection criterion, the quality of cells is considered as most important factor when performing the cell reselection. If a reselected cell is not a suitable cell, the UE excludes the reselected cell or a frequency of the reselected cell from targets of the cell reselection.

Figure 4:
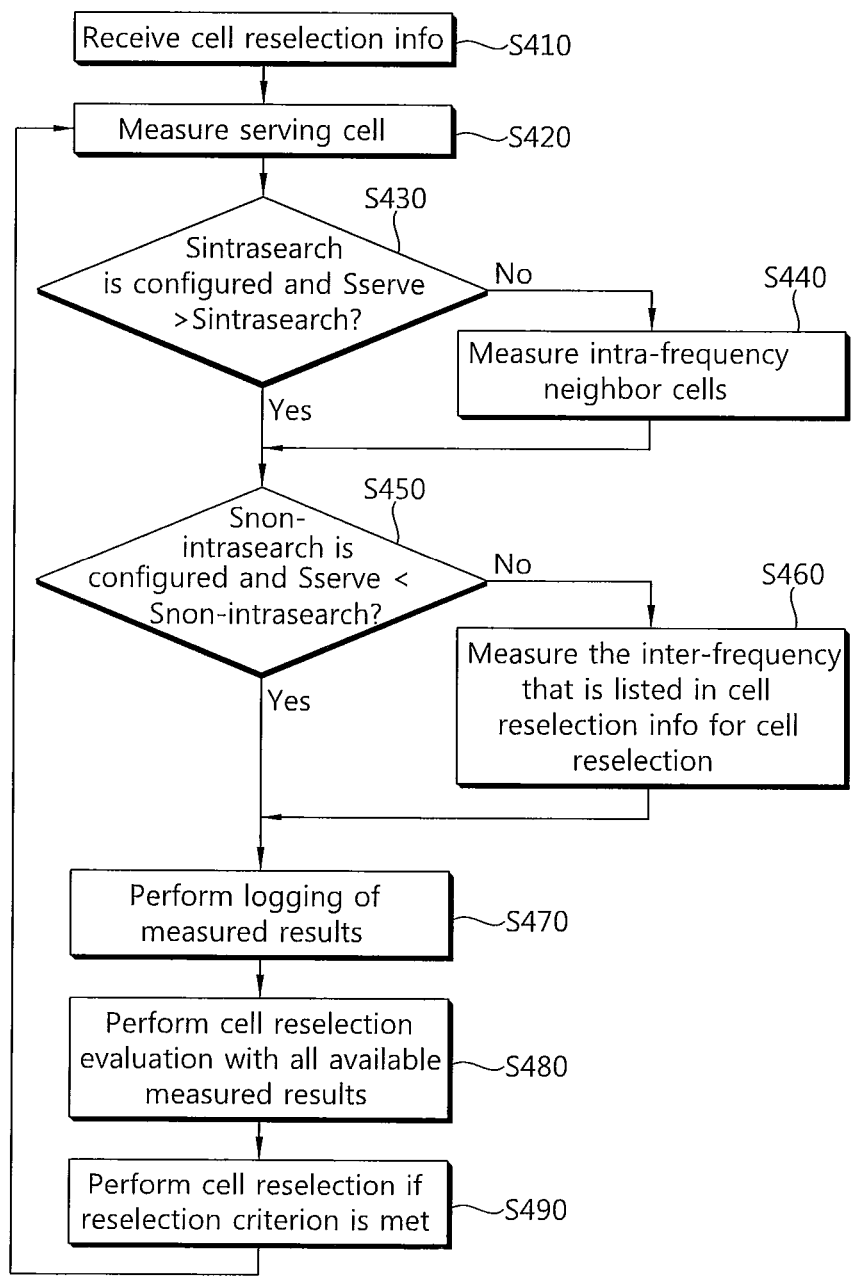
FIG. 4 is a flowchart showing a measurement method of a UE.

FIG. 4 is a flowchart showing a measurement method of a UE.

A UE measures neighbor cells in order to know whether there is a neighbor cell better than a serving cell and to access to the cell if such a neighbor cell exists. However, when the neighbor cells are measured persistently, it may cause power consumption of the UE. Therefore, if the serving cell has sufficiently good quality, measurement on the neighbor cells is skipped if possible so as to reduce power consumption of the UE.

The UE receives cell reselection information from a BS (step S410). The cell reselection information may include two thresholds, i.e., Sintrasearch and Snon-intrasearch.

The UE measures the serving cell (step S420). A measurement result of the serving cell is denoted by Sserve.

The UE compares Sserve and Sintrasearch (step S430). If Sserve is less than Sintrasearch, the UE performs intra-frequency measurement (step S440). Otherwise, if Sserve is greater than Sintrasearch, the UE can skip measurement on neighbor cells having the same frequency as the serving cell.

If the cell reselection information does not include Sintrasearch, the UE cannot skip the measurement on the neighbor cells having the same frequency as the serving cell.

The UE compares Sserve and Snon-intrasearch (step S450). If Sserve is greater than Snon-intrasearch, the UE performs inter-frequency measurement (step S460). That is, if the serving cell has better quality than Snon-intrasearch, the UE can skip measurement on neighbor cells having a different frequency from the serving cell.

If the cell reselection information does not include Snon-intrasearch, the UE cannot skip the measurement on the neighbor cells having a different frequency from the serving cell.

The UE logs the measurement result (step S470). The UE performs cell reselection evaluation with all available measurement results (step S480). If a reselection criterion is met, the UE performs cell reselection (step S490).

Figure 5:
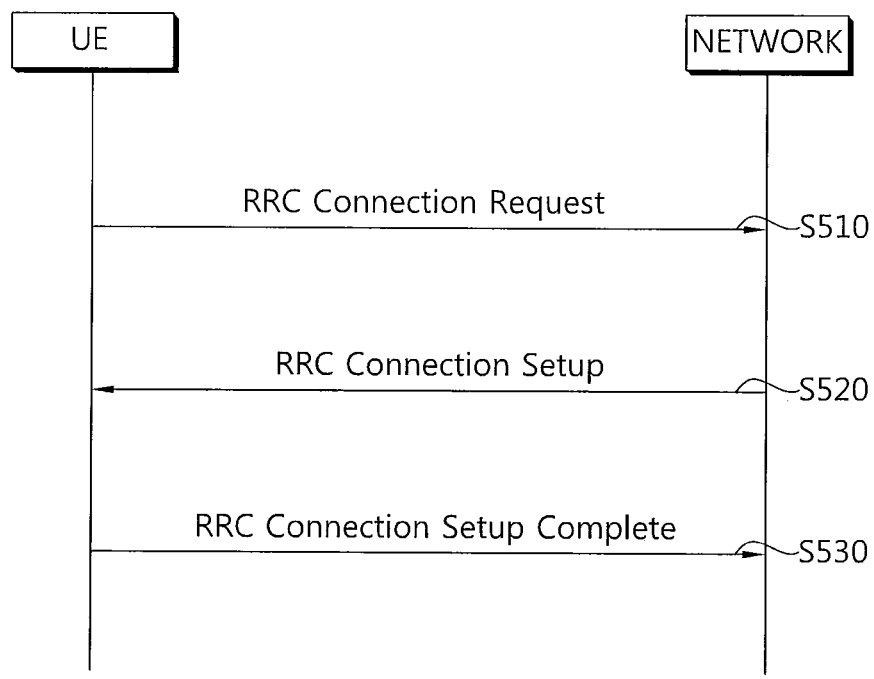
FIG. 5 is a flowchart showing an RRC connection establishment procedure.

FIG. 5 is a flowchart showing an RRC connection establishment procedure.

A UE sends to a network an RRC connection request message for requesting an RRC connection (step S510). The network sends an RRC connection setup message in response to the RRC connection request (step S520). After receiving the RRC connection setup message, the UE enters an RRC connected mode.

The UE sends to the network an RRC connection setup complete message used to confirm successful completion of the RRC connection establishment (step S530).

A RRC connection reestablishment is similarly performed as the RRC connection establishment. The RRC connection establishment is to re-establish the RRC connection, which involves the resumption of SRB1 operation, the re-activation of security and the configuration of only the primary cell. A UE sends to a network an RRC connection reestablishment request message for requesting an RRC connection establishment. The network sends an RRC connection reestablishment message in response to the RRC connection reestablishment request. The UE sends to the network an RRC connection reestablishment complete message as a response for the RRC connection reestablishment.

Figure 6:
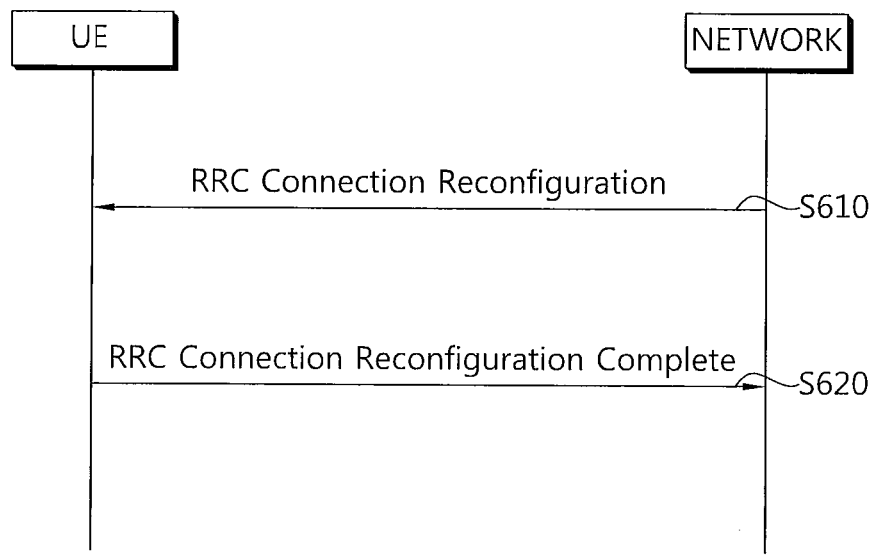
FIG. 6 is a flowchart showing an RRC connection reconfiguration procedure. An RRC connection.

FIG. 6 is a flowchart showing an RRC connection reconfiguration procedure. An RRC connection reconfiguration is used to modify an RRC connection. This is used to establish/modify/release an RB, to perform a handover, to setup/modify/release measurements, and to add/modify/release secondary cells.

A network sends to a UE an RRC connection reconfiguration message for modifying the RRC connection (step S610). In response to the RRC connection reconfiguration, the UE sends to the network an RRC connection reconfiguration complete message used to confirm successful completion of the RRC connection reconfiguration (step S620).

Figure 7:
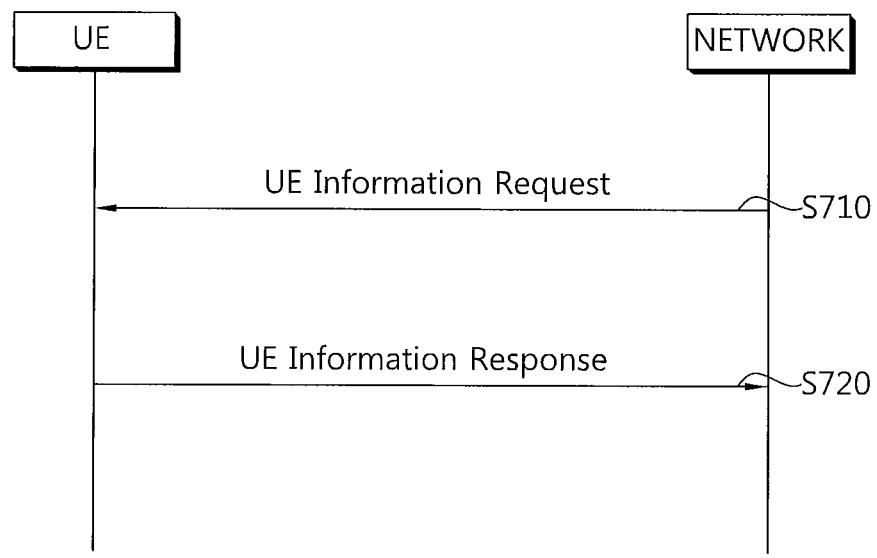
FIG. 7 is a flowchart showing a UE information reporting procedure.

FIG. 7 is a flowchart showing a UE information reporting procedure.

A network sends to a UE a UE information request message for obtaining UE information (step S710). The UE information request message includes a field for indicating whether the UE will report information on a random access process and/or a radio link failure. The UE information request message includes a field for indicating whether the UE will report a logged measurement.

The UE sends to the network a UE information response message including information requested by the UE information request (step S720).

Now, minimization of driving tests (MDT) will be described.

The MDT is a test performed by service providers for coverage optimization by using a UE instead of using an automobile. A coverage varies depending on a location of a BS, deployment of buildings nearby, a user's usage environment, etc. Therefore, it is required for the service providers to periodically perform driving tests, and a lot of costs and resources are consumed. The UE performs measurements and send the results to the service provider so that the service provider utilizes MDT for network optimization.

The MDT can be classified into a logged MDT and an immediate MDT. According to the logged MDT, after performing the MDT measurement, the UE delivers a logged measurement to a network available at a time of a reporting condition. According to the immediate MDT, after performing the MDT measurement, the UE delivers the measurement to the network at points in time when a configured reporting condition is satisfied. The logged MDT performs the MDT measurement in an RRC idle mode, but the immediate MDT performs the MDT measurement in an RRC connected mode.

Figure 8:
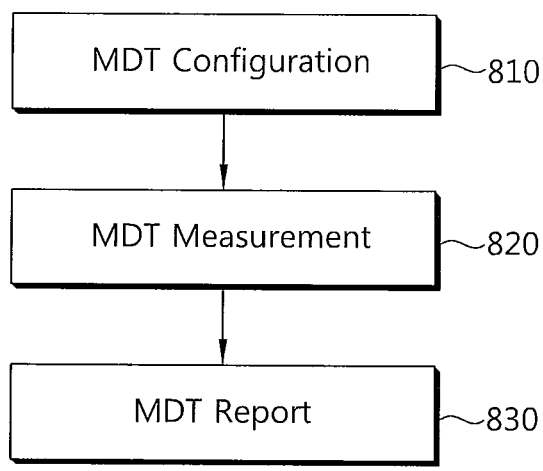
FIG. 8 shows a procedure of performing an MDT.

FIG. 8 shows a procedure of performing an MDT.

The MDT includes an MDT configuration 810, an MDT measurement 820, and an MDT report 830 which are performed in that order.

The MDT configuration can be transmitted from a network to a UE via a logged measurement configuration message which is an RRC message. The UE can receive the MDT configuration in an RRC connected mode. Even if the UE transitions to an RRC idle mode, the MDT configuration is kept, and thus an MDT measurement result is also kept.

The MDT configuration may include at least one of a logging interval, a reference time, and an area configuration. The logging interval indicates a periodicity for storing a measurement result. The reference time is used by the UE to echo back the reference in a logged measurement report. The area configuration indicates an area for which the UE is requested to perform logging.

The UE performs the MDT measurement based on the MDT configuration. For example, the MDT measurement is performed at every logging interval.

A measurement value may be a value well-known to those ordinary skilled in the art, such as reference signal received power (RSRP), reference signal received quality (RSRQ), received signal code power (RSCP), and Ec/No.

The UE sends to the network a logged measurement in the RRC connected mode. In the logged MDT, the UE logs the measurement in the RRC idle mode. Then, upon re-entering the RRC connected mode, the UE sends the logged measurement to the network.

The logged measurement may include at least one of measurement results of available serving cell measurements, measurement results of available neighbor cell measurements, time information, and location information.

For the MDT report, the UE information reporting procedure of FIG. 7 can be used. The network sends to the UE an information request including a field that indicates a report of the logged measurement. The UE sends to the network an information response including the logged measurement.

According to the conventional technique, when a BS requests a UE to report a logged measurement, the UE transmits one report message. In general, a maximum size of message that can be transmitted at once is fixed. For example, a maximum size of a packet data convergence protocol (PDCP) service data unit (SDU) is 8188 bytes. Therefore, when the logged measurement has a size exceeding a size of one message, the UE inevitably discards the remaining logged measurements.

According to the proposed invention, the UE can transmit the logged measurement by distributing it through a plurality of report messages.

According to the proposed invention, a report message may include information on whether an additional log report is necessary. The information may indicate whether the additional log report is necessary. Alternatively, the information may indicate that there is no more remaining log in the UE after a current log report.

In one embodiment, the report message may include information on a size of the logged measurement.

In one embodiment, a network may transmit control information related to reporting of the logged measurement of the UE. The control information may include configuration information for configuring the size of the logged measurement to be included in the report message.

If the UE does not receive the configuration information, the UE may randomly determine the size of the logged measurement to be included in the report message. The UE may determine the size of the report message to be below a maximum size (e.g., a maximum value of a PDCP SDU size) of a control signaling message. The control signaling message is an RRC message or its equivalent message.

Figure 9:
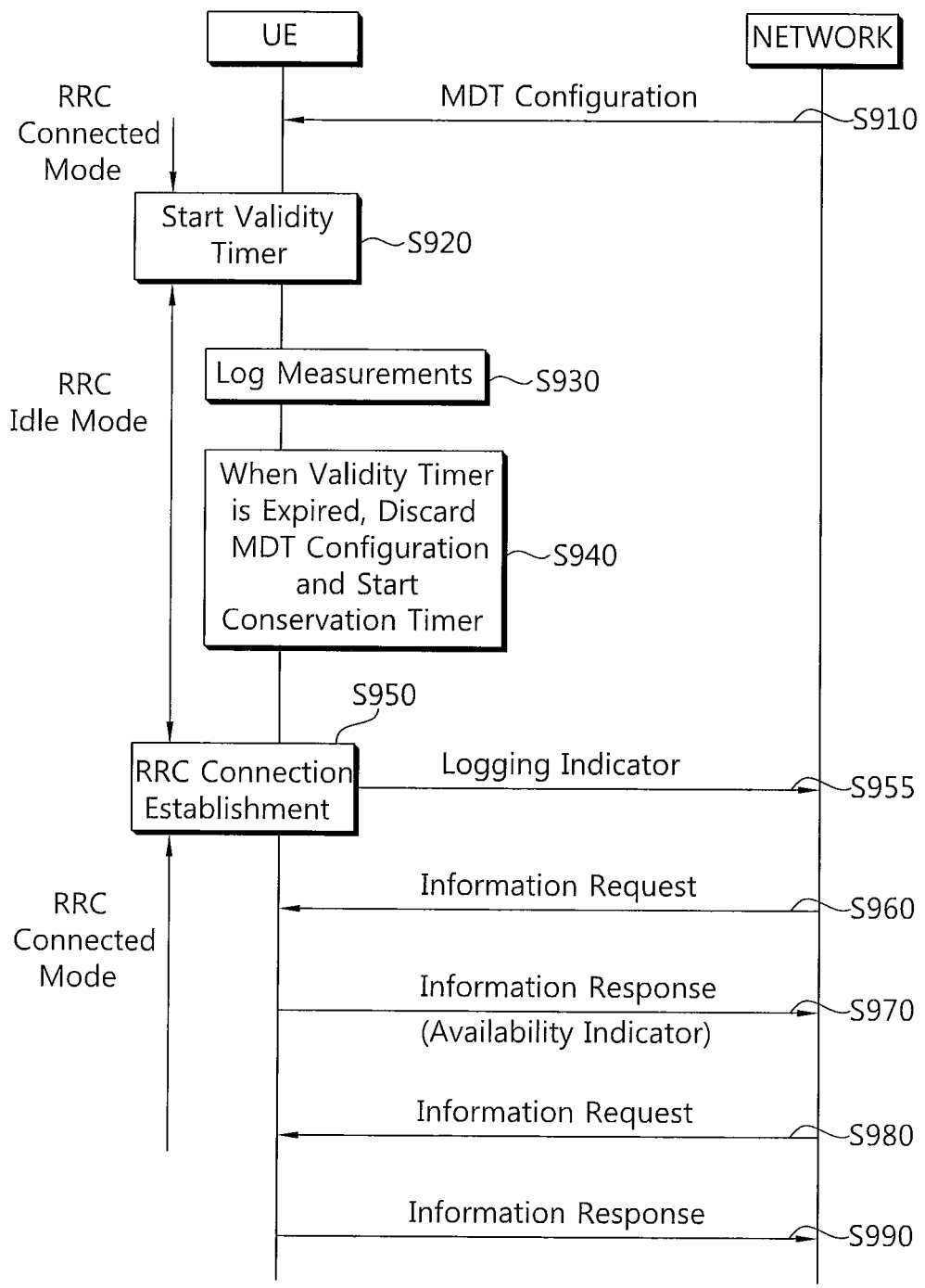
FIG. 9 is a flowchart showing a method of reporting a logged measurement according to an embodiment of the present invention.

FIG. 9 is a flowchart showing a method of reporting a logged measurement according to an embodiment of the present invention.

A UE receives an MDT configuration from a network (step S910). The UE is in an RRC connected mode in which an RRC connection is established with a serving cell. The MDT configuration may include at least one of a logging interval, a reference time, and an area configuration.

Upon receiving the MDT configuration, the UE starts a validity timer (step S920). The validity timer indicates a lifetime of the MDT configuration. The validity timer may be included in the MDT configuration. This value is called a logging duration. When the UE receives the MDT configuration, the UE sets a value of the validity timer to the logging duration, and then starts the validity timer.

The UE transitions to an RRC idle mode, and logs measurements on the basis of the MDT configuration while the validity timer is running (step S930).

The logged measurement may include one or more logged entries. The logged entry includes a measurement result logged at a specific time. For example, the UE may perform measurement in the logging interval, and may store a measurement time and a measurement result as one logged entry relatively to a reference time.

At the expiry of the validity timer, the UE discards the MDT configuration, and starts a conservation timer (step S940). The UE removes the MDT configuration and stores the MDT measurement. However, the logged measurement is maintained. The conservation timer indicates a lifetime of the logged measurement.

Although it is shown herein that the validity timer expires in the RRC idle mode, a time at which the validity timer expires may vary depending on the determined timer value.

At the expiry to the conservation timer, the logged measurement is autonomously discarded. The conservation timer may have a fixed value. For example, the value of the conservation timer may be 48 hours. Alternatively, the value of the conservation timer may be included in the MDT configuration, and may be reported by the BS to the UE.

The UE enters the RRC connected mode by establishing/reestablishing/reconfiguring an RRC connection with the BS (step S950).

As the UE transitions from the RRC idle mode to the RRC connected mode, a logging indicator is sent to the network (step S955). The logging indicator may be a 1-bit indicator indicating availability of the logged measurement. The UE performs MDT measurement in the idle mode, and reports whether there is the logged measurement to the network when entering the connected mode.

The UE can send the logging indicator to the network when the RRC connection is established, reestablished, or reconfigured. For example, when performing the RRC connection procedure of FIG. 5, the logging indicator may be included in the RRC connection setup complete message. When performing the RRC connection re-configuration procedure of FIG. 6, the logging indicator may be included in the RRC connection reconfiguration complete message.

Upon being aware of existence of the logged measurement on the basis of the logging indicator, the network sends an information request for requesting reporting of the logged measurement to the UE (step S960).

The UE sends an information response including the logged measurement to the network (step S970). The information response includes a plurality of logged entries included in the logged measurement in an ascending order starting from a first logged entry.

If the logged measurement is not empty, the information response includes an availability indicator indicating that there is a remaining logged measurement. If there are one or more remaining logged entries in the logged measurement, the information response may include an available indicator indicating that there is a remaining logged measurement. If there are one or more remaining logged entries in the logged measurement, the information response may include an available indicator indicating that there is an additional remaining logged measurement.

If there is no remaining logged entry in the logged measurement, the availability indicator may not be included in the information response. Alternatively, if there is no remaining logged entry in the logged measurement, the availability indicator may indicate that there is no remaining logged entry.

When the information response is successfully transmitted, the UE may discard the logged entry included in the information response. Upon receiving a report message including the availability indicator indicating necessity of an additional log report, the network sends an information request to the UE to request the log report (step S980).

The UE sends an information response including the remaining logged measurement to the network (step S990). If the information response does not include the availability indicator, the network can know that there is no more remaining logged measurement. Alternatively, the information response may include an indicator indicating that there is no remaining logged entry.

Figure 10:
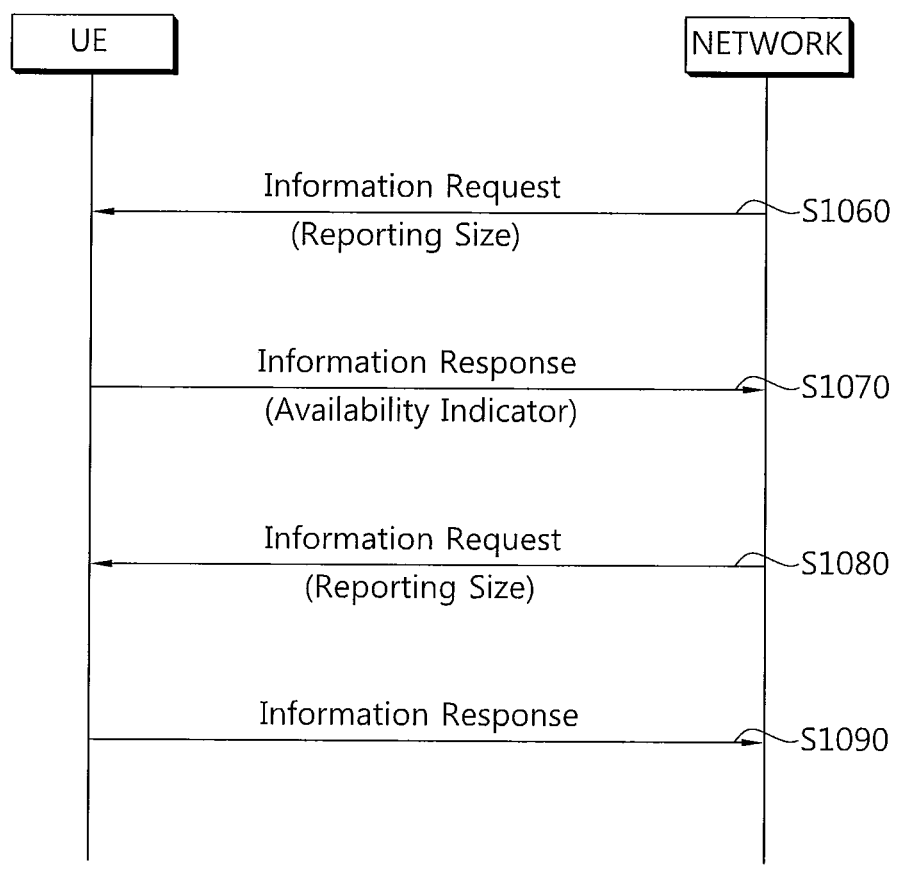
FIG. 10 is a flowchart showing a method of reporting a logged measurement according to another embodiment of the present invention.

FIG. 10 is a flowchart showing a method of reporting a logged measurement according to another embodiment of the present invention. It is assumed that steps S910 to S955 of FIG. 9 are performed in advance.

A BS sends an information request including information on a reporting size to a UE (step S1060). The reporting size indicates a size of a logged measurement to be included in an information response.

The UE reports the information response including the logged measurement having a size corresponding to the reporting size to the BS (step S1070). If there is a remaining logged measurement, the information response may include an availability indicator.

The BS sends an information request including information on a new reporting size to the UE (step S1080).

The UE reports an information response including the remaining logged measurement to the BS (step S1090).

Although it is shown herein that all logged measurements are reported by exchanging an additional information request and information response only one time, there is no limitation in the number of times of performing the exchanging of the information request and the information response in order to report all logged measurements.

The reporting size may be included in the first information request, and may not be included in the later information request. In this case, the size of the logged measurement included in the additional information response may be determined according to the reporting size included in the first information request.

The reporting size may be included in an MDT configuration.

Figure 11:
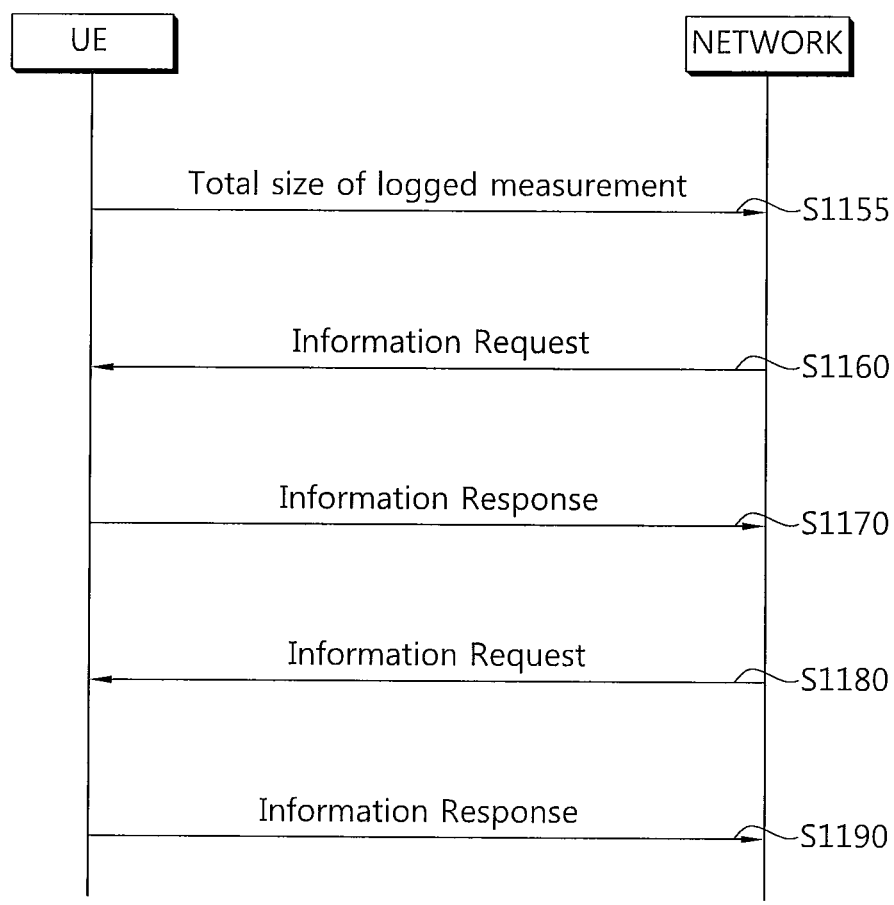
FIG. 11 is a flowchart showing a method of reporting a logged measurement according to another embodiment of the present invention.

FIG. 11 is a flowchart showing a method of reporting a logged measurement according to another embodiment of the present invention. It is assumed that steps S910 to S955 of FIG. 9 are performed in advance.

A UE sends size information regarding a full size of a logged measurement to a BS (step S1155). The size information may be transmitted together with a logging indicator or separately from the logging indicator.

The BS requests the UE to transmit the logged measurement until the size of the logged measurement included in response messages received from the UE becomes equal to a size indicated by the size information.

The BS sends an information request to the UE (step S1160), and the UE reports an information response including the logged measurement to the BS (step S1170).

If the size of the logged measurement included in the information response is less that the size indicated by the size information, the BS sends an information request to the UE (step S1180). The UE reports an information response including the remaining logged measurement to the BS (step S1190).

Meanwhile, in the embodiments of FIG. 9 to FIG. 11, the UE may not receive an additional information request for the reporting of the remaining logged measurement. That is, after receiving the first information request, the UE may transmit a plurality of information responses to transmit all logged measurements.

Figure 12:
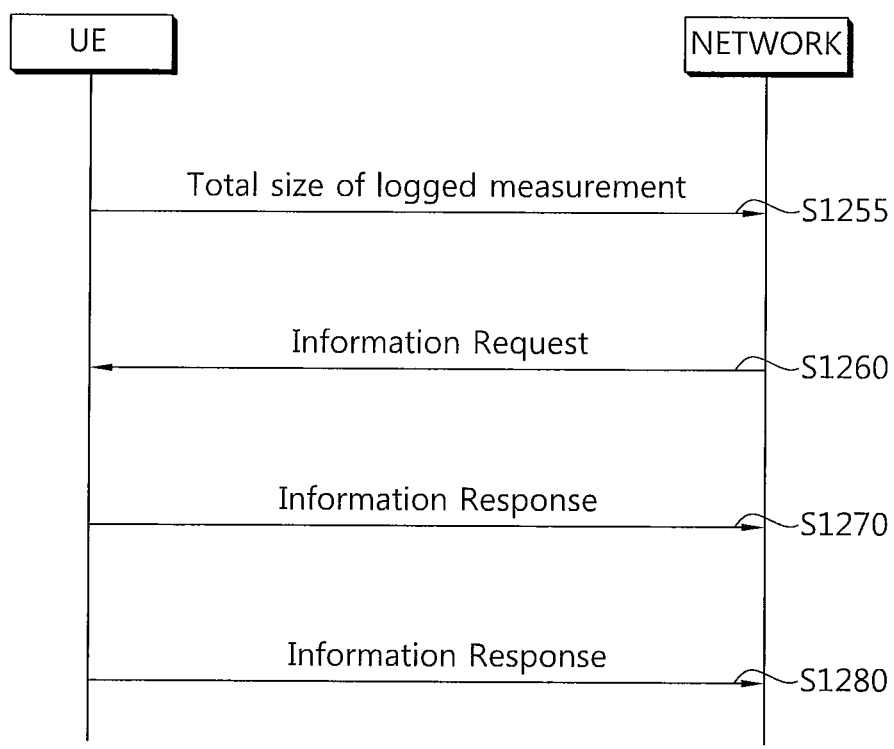
FIG. 12 is a flowchart showing a method of reporting a logged measurement according to another embodiment of the present invention.

FIG. 12 is a flowchart showing a method of reporting a logged measurement according to another embodiment of the present invention. It is assumed that steps S910 to 5955 of FIG. 9 are performed in advance.

A UE sends size information regarding a full size of a logged measurement to a BS (step S1255). The size information may be transmitted together with a logging indicator or separately from the logging indicator.

The BS sends an information request to the UE (step S1260).

The UE reports an information response including the logged measurement to the BS (step S1270). If the size of the logged measurement included in the information response is less that the size indicated by the size information, the UE reports an information response including the remaining logged measurement to the BS (step S1280).

Although it is shown in the aforementioned embodiments that the logged measurements are collected in the RRC idle mode, the logged measurement can also be collected in the RRC connected mode.

Figure 13:
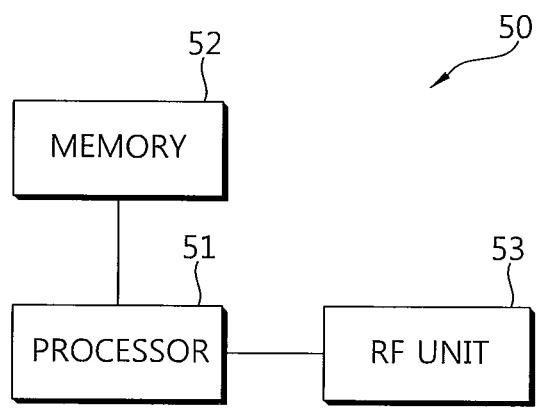
FIG. 13 is a block diagram showing a wireless apparatus for implementing an embodiment of the present invention.

FIG. 13 is a block diagram showing a wireless apparatus for implementing an embodiment of the present invention. This apparatus implements an operation of a UE described in the aforementioned embodiments of FIGS. 9-12.

An apparatus 50 includes a processor 51, a memory 52, and a radio frequency (RF) unit 53. The processor 51 implements the proposed functions, processes, and/or methods. The processor 51 transitions between an RRC connected mode and an RRC idle mode, and measures a logged MDT on the basis of an MDT configuration.

The memory 52 is coupled to the processor 51, and stores the MDT configuration and a logged measurement. The aforementioned embodiments of FIGS. 9-12 can be implemented by the processor 51 and the memory 52.

The RF unit 53 is coupled to the processor 51, and transmits and receives a radio signal.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method of reporting a logged measurement in a wireless communication system, the method comprising:
   receiving, by a user equipment, a Minimization of Drive Tests (MDT) configuration;
   logging, by the user equipment, measurements based on the MDT configuration to collect a logged measurement;
   receiving, by the user equipment, an information request from a base station,
   wherein the information request is transmitted from the base station in order to request the logged measurement by the base station; and
   transmitting, by the user equipment, an information response to the base station, wherein the information response includes a part of the logged measurement and an availability indicator, the availability indicator indicating that all entries in the logged measurement are not included in the information response,
   wherein the availability indicator indicates a total size of the logged measurement to be received by the base station or an expected number of segments of the logged measurement to be received by the base station, and
   wherein the availability indicator further indicates a last segment of the logged measurement to be received by the base station.

2. The method of claim 1, wherein the logged measurement includes a plurality of logged entries, each logged entry including measurement results of at least one serving cell and time information.

3. The method of claim 2, wherein the information response includes one or more logged entries from the logged measurement starting from entries logged first.

4. The method of claim 1, wherein the availability indicator is not included in the information response if all entries in the logged measurement are included in the information response.

5. The method of claim 1, further comprising:
   transmitting, by the user equipment, a logging indicator to the base station, the logging indicator indicating an availability of the logged measurement.

6. The method of claim 5, wherein the measurements are logged in a Radio Resource Control (RRC) idle mode, and the logging indicator is transmitted upon transitioning from the RRC idle mode to a RRC connected mode.

7. The method of claim 1, further comprising:
   upon receiving the MDT configuration, starting a validity timer,
   wherein the measurements are logged while the validity timer is running.

8. The method of claim 7, wherein the MDT configuration includes a value for the validity timer and a logging interval indicating periodicity for logging measurement results.

9. The method of claim 8, further comprising:
   stopping to log the measurements and keeping the logged measurement when the validity timer is expired.

10. An apparatus of reporting a logged measurement in a wireless communication system, the apparatus comprising:
    a radio frequency unit for transmitting and receiving radio signals; and
    a processor operatively coupled with the radio frequency unit and configured for:
    receiving a Minimization of Drive Tests (MDT) configuration;
    logging measurements based on the MDT configuration to collect a logged measurement;
    receiving an information request from a base station,
    wherein the information request is transmitted from the base station in order to request the logged measurement by the base station; and
    transmitting an information response to the base station, wherein the information response includes a part of the logged measurement and an availability indicator, the availability indicator indicating that all entries in the logged measurement are not included in the information response,
    wherein the availability indicator indicates a total size of the logged measurement to be received by the base station or an expected number of segments of the logged measurement to be received by the base station, and
    wherein the availability indicator further indicates a last segment of the logged measurement to be received by the base station.

11. The apparatus of claim 10, wherein the logged measurement includes a plurality of logged entries, each logged entry including measurement results of at least one serving cell and time information.

12. The apparatus of claim 10, wherein the information response includes one or more logged entries from the logged measurement starting from entries logged first.

13. The apparatus of claim 10, wherein the availability indicator is not included in the information response if all entries in the logged measurement are included in the information response.

14. The apparatus of claim 10, wherein the processor is configured for transmitting a logging indicator to the base station, the logging indicator indicating an availability of the logged measurement.

15. The apparatus of claim 10, wherein the processor is configured for starting a validity timer upon receiving the MDT configuration, wherein the measurements are logged while the validity timer is running.

* * * * *